United States Patent
Cassiano Gaspar et al.

(10) Patent No.: US 12,378,411 B2
(45) Date of Patent: Aug. 5, 2025

(54) USE OF A REINFORCED THERMOPLASTIC COMPOSITION

(71) Applicant: Arkema France, Colombes (FR)

(72) Inventors: Stefânia Cassiano Gaspar, Serquigny (FR); Benoît Brule, Serquigny (FR); Mathieu Sabard, Serquigny (FR); Xiong Yao, Jiangsu (CN); Marie Pommier De Santi, Yao (JP)

(73) Assignee: ARKEMA FRANCE, Puteaux (FR)

( * ) Notice: Subject to any disclaimer, the term of this patent is extended or adjusted under 35 U.S.C. 154(b) by 772 days.

(21) Appl. No.: 17/794,874

(22) PCT Filed: Jun. 25, 2020

(86) PCT No.: PCT/EP2020/067873
§ 371 (c)(1),
(2) Date: Jul. 22, 2022

(87) PCT Pub. No.: WO2020/260479
PCT Pub. Date: Dec. 30, 2020

(65) Prior Publication Data
US 2023/0060165 A1   Mar. 2, 2023

(30) Foreign Application Priority Data

Jun. 28, 2019   (WO) ................ PCT/CN2019/093763

(51) Int. Cl.
| | |
|---|---|
| *C08L 77/06* | (2006.01) |
| *C08G 69/26* | (2006.01) |
| *C08J 5/04* | (2006.01) |
| *C08K 5/098* | (2006.01) |
| *C08K 7/14* | (2006.01) |

(52) U.S. Cl.
CPC ............. *C08L 77/06* (2013.01); *C08G 69/26* (2013.01); *C08J 5/043* (2013.01); *C08K 5/098* (2013.01); *C08K 7/14* (2013.01); *C08J 2377/06* (2013.01); *C08K 2201/003* (2013.01); *C08L 2205/02* (2013.01)

(58) Field of Classification Search
CPC . C08J 2377/06; C08J 5/043; C08K 2201/003; C08K 7/14; C08L 2205/02; C08L 77/02; C08L 77/06
See application file for complete search history.

(56) References Cited

U.S. PATENT DOCUMENTS

| | | | |
|---|---|---|---|
| 8,476,354 B2 | 7/2013 | Topoulos | |
| 9,815,967 B2 | 11/2017 | Harder et al. | |
| 10,246,587 B2 | 4/2019 | Yasuda et al. | |
| 11,359,091 B2 | 6/2022 | Wiedemann et al. | |
| 2008/0167415 A1 | 7/2008 | Stoeppelmann et al. | |
| 2010/0227122 A1 | 9/2010 | Kumazawa et al. | |
| 2014/0066561 A1* | 3/2014 | Pfleghar | C08K 3/22 524/425 |
| 2014/0127440 A1* | 5/2014 | Norfolk | C08K 3/30 528/340 |
| 2015/0080516 A1 | 3/2015 | Kumazawa et al. | |
| 2016/0369098 A1* | 12/2016 | Yasuda | C08K 7/14 |
| 2016/0376423 A1 | 12/2016 | Harder et al. | |
| 2019/0241738 A1 | 8/2019 | Brule et al. | |
| 2019/0241739 A1 | 8/2019 | Brule et al. | |
| 2020/0262987 A1 | 8/2020 | Cassiano Gaspar et al. | |

FOREIGN PATENT DOCUMENTS

| | | |
|---|---|---|
| CN | 101356236 A | 1/2009 |
| CN | 102264839 A | 11/2011 |
| CN | 102675863 A | 9/2012 |
| CN | 105829431 A | 8/2016 |
| CN | 106255725 A | 12/2016 |
| CN | 109844026 A | 6/2019 |
| EP | 0592942 A1 | 4/1994 |
| EP | 1942147 A1 | 7/2008 |
| EP | 2703436 A1 | 3/2014 |
| EP | 3083805 A1 | 10/2016 |
| EP | 3502164 A1 | 6/2019 |
| FR | 3057575 A1 | 4/2018 |
| WO | 2013012980 A1 | 1/2013 |
| WO | 2018073536 A1 | 4/2018 |
| WO | 2019058077 A1 | 3/2019 |

OTHER PUBLICATIONS

International Preliminary Report on Patentability Chapter I (PCT/IB/373) mailed on Dec. 28, 2021 by The International Bureau of WIPO in corresponding International Patent Application No. PCT/EP2020/067873. (7 pages).
International Preliminary Report on Patentability Chapter I mailed on Jan. 6, 2022 by The International Bureau of WIPO in corresponding International Patent Application No. PCT/CN2019/093763. (8 pages).
International Search Report (PCT/ISA/210) and Written Opinion (PCT/ISA/237) mailed on Mar. 27, 2020, by the National Intellectual Property Administration, PRC (ISA/CN) for International Application No. PCT/CN2019/093763. (11 pages).
International Search Report (PCT/ISA/210) and Written Opinion (PCT/ISA/237) mailed on Sep. 28, 2020, by the European Patent Office as the International Searching Authority for International Application No. PCT/EP2020/067873. (12 pages).

* cited by examiner

*Primary Examiner* — Ana L. Woodward
(74) *Attorney, Agent, or Firm* — Boone IP Law

(57) ABSTRACT

The field of molded articles and fiber-reinforced thermoplastic compositions for obtaining them. The use of the reinforced thermoplastic composition for obtaining a thin molded article with reduced warpage. The composition may include: from 30 to 70% by weight of an amorphous polyamide matrix by total weight of the composition; from 30 to 70% by weight of glass fibers with a circular cross-section by total weight of the composition; and optionally additives.

10 Claims, No Drawings

USE OF A REINFORCED THERMOPLASTIC COMPOSITION

TECHNICAL FIELD

The present invention belongs to the field of molded articles and reinforced thermoplastic compositions for obtaining them. It relates to the use of the reinforced thermoplastic composition for obtaining a thin molded article with reduced warpage.

TECHNICAL BACKGROUND

Polyamides are widely used for obtaining articles, for use in many applications, such as in the field of consumer electronics, household appliances, automotive equipment, for example in televisions, digital cameras, digital games, phones and tablets, drones, printers, computers. Indeed, thermoplastic polyamide-based compositions are materials capable of being transformed e.g. by injection to manufacture plastic articles or parts.

The properties of the articles obtained may vary greatly depending on the type of polyamides, their proportions, their combinations, etc. The properties of the articles—such as for example the modulus (e.g. tensile modulus), the toughness, the heat distortion, the mechanical resistance (e.g. elongation at break, stress at break, bending strength), the surface quality and/or the processability—may need to be adapted to the targeted application. For example, as per the modulus, as the articles tend to be smaller and thinner, their thicknesses decrease. Then the modulus has to be increased in order to get the right rigidity.

In order to obtain the expected properties, further compounds may be mixed with the polyamides, such as reinforcing agents. Reinforcing agents are added in order to increase the modulus of the molded articles. Different types of glass fibers have been added to thermoplastic compositions comprising polyamide for obtaining reinforced thermoplastic compositions, particularly glass fibers with non-circular cross-section, such as elliptical, oval, elongated, flat, rectangular or "cocoon-shaped" cross-sections. Different prior art techniques are reported in the European patent application EP 1942147 A1 published on 9Jul. 2008.

One drawback of fiber-reinforced thermoplastic articles is warpage. Different techniques have been developed for reducing warpage.

Warpage may be caused by various origins, depending on the composition of the article, the injection-molding process, etc. For example, warpage may be caused by the orientation of the fibers, leading to local internal stress and shrinkage differences between in-flow and crossflow directions. Warpage may also be caused by a high rate of crystallization or a high degree of crystallinity.

In addition to the above-mentioned properties, there is a need for limiting the warpage of the molded articles obtained. However, some techniques have failed at providing articles having a sufficient reduced warpage. Warpage is unwanted as it complexifies the production process and may disrupt the device assembly. Other techniques, such as the technique disclosed in EP 1942147 A1, are said to allow obtaining low warpage.

Particularly, EP 1942147 A1 discloses a composition comprising specific polyamides and glass fibers, both in terms of types and proportions. The composition particularly comprises up to 60 wt.-% of at least one aliphatic semi-crystalline polyamide with a solution viscosity, measured in m-cresol (0.5 wt.-%), of $\eta_{rel}$ less than 1.9; and up to 60 wt. % of at least one amorphous or microcrystalline polyamide based on aliphatic, cycloaliphatic or aromatic diamines, dicarboxylic acids, lactams and/or aminocarboxylic acids, wherein the composition comprises from 20 to 60 wt. % of both polyamides; and wherein at least 50 wt. % of aliphatic polyamides are present in the polyamide matrix. The composition also comprises from 40 to 80 wt.-% of flat glass fibers with an elongated shape, wherein the glass fibers have a non-circular cross-section and a size ratio of the main cross-section to the secondary cross-section of between 2 to 5. Flat glass fibers are rather expensive materials of limited availability. EP 1942147 A1 repeatedly mentions the need for using flat glass fibers i.e. glass fibers with a non-circular cross-section.

WO 2018/073536 A1 discloses the use of a semi-aromatic polyamide i.e. a MXDZ polyamide in a mixture particularly comprising aliphatic semi-crystalline polyamides and glass fibers with a circular cross-section to prevent warpage. This technology seems to target a modification of the rate of crystallization of aliphatic semi-crystalline polyamides by using semi-aromatic polyamides.

EP 2703436 A1 discloses strengthened thermoplastic molding compounds comprising glass fibers and particulate filler materials. The molding compounds are preferably polyamides, such as partially crystalline, aliphatic polyamides, partially aromatic polyamides, and/or amorphous polyamides. The glass fibers may be, amongst other options, E-glass fibers with a circular (round) or a non-circular (flat) cross-section, while the reduction in warpage is only associated with flat glass fibers.

There is thus a need for providing molded articles, particularly injection-molded articles, having a reduced warpage. There is also a need for providing molded articles, particularly injection-molded articles, having both a reduced warpage and a satisfactory mechanical resistance.

SUMMARY OF THE INVENTION

It is a first object of the invention to provide the use of a fiber-reinforced, notably short fiber reinforced thermoplastic composition for obtaining a molded article having a reduced warpage,
wherein the composition comprises:
from 30 to 70% by weight of an amorphous polyamide matrix by total weight of the composition; and,
from 30 to 70% by weight of glass fibers with a circular cross-section by total weight of the composition; and,
optionally additives;
wherein the amorphous polyamide matrix comprises at least one amorphous polyamide and at least one aliphatic semi-crystalline polyamide;
wherein the fiber-reinforced thermoplastic composition has a melt viscosity of at most 1,300 Pa·s, when measured at a shear rate of 110 s$^{-1}$ at 260° C. according to the ISO11443:2014 standard;
wherein the weight ratio between the amorphous polyamide and the aliphatic semi-crystalline polyamide in the amorphous polyamide matrix is from 60:40 to 90:10;
wherein the amorphous polyamide is selected from the group consisting of homopolyamides of formula $X_1Y_1$, copolyamides of formula $Z_1/X_1Y_1$ and/or copolyamides of formula $X_0Y_0/X_1Y_1$;
wherein the unit $X_1$ is derived from a cycloaliphatic diamine monomer having from 8 to 18 carbons or a mixture of at least two of these monomers thereof;
wherein the unit $Y_1$ is derived from a linear aliphatic diacid monomer having from 4 to 36 carbons or a mixture of at least two of these monomers thereof; or wherein the unit $Y_1$ is derived from an aromatic diacid having from 6 to 18 carbons or a mixture of at least two of these monomers thereof;

wherein the unit $Z_1$, if present, is derived from an amino acid monomer having from 9 to 18 carbons or a lactam monomer having from 6 to 18 carbons;

wherein the unit $X_0$, if present, is derived from a linear aliphatic diamine monomer having from 4 to 18 carbons or a mixture of at least two of these monomers thereof;

wherein the unit $Y_0$, if present, is derived from a linear aliphatic diacid monomer having from 4 to 36 carbons or a mixture of at least two of these monomers thereof;

wherein the aliphatic semi-crystalline polyamide is selected from the group consisting of polyamides of formula $Z_2$ and/or polyamides of formula $X_2Y_2$;

wherein the unit $Z_2$, if present, is derived from an amino acid having from 9 to 18 carbons; or a lactam having from 6 to 18 carbons;

wherein the unit $X_2$, if present, is derived from an aliphatic diamine monomer from 4 to 18 carbons, or mixtures thereof; and wherein the unit $Y_2$, if present, is derived from a linear aliphatic diacid monomer having from 4 to 36 carbons, or mixtures thereof.

In some embodiments, the amino acid monomer, from which the unit $Z_1$ is derived, if present, is selected from the group consisting of 9-aminononanoic acid, 10-aminodecanoic acid, 10-aminoundecanoic acid, 11-aminoundecanoic acid, 12-aminododecanoic acid, and derivatives thereof, especially N-heptyl-11-aminoundecanoic acid; or the lactam monomer, from which the unit $Z_1$ is alternatively derived, if present, is selected from the group consisting of caprolactam, pelargolactam, decanolactam, undecanolactam, lauryllactam, pyrrolidinone, 2-piperidinone, enantholactame, caprylolactam, and derivatives thereof.

In some embodiments, the cycloaliphatic diamine monomer, from which the unit $X_1$ is derived, is selected from the group consisting of bis(3,5-dialkyl-4-aminocyclohexyl) methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl) methane, p-bis(aminocyclohexyl)methane, isopropylidenedi (cyclohexylamine), isophorone-diamine, 2,6-bis(amino methyl)norbornane, bis(aminomethyl)cyclohexane.

In some embodiments, the linear aliphatic diamine monomer, from which the unit $X_0$ is derived, if present, is selected from the group consisting of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, or mixtures thereof.

In some embodiments, the linear aliphatic diacid monomer, from which the unit $Y_1$ and/or the unit $Y_0$ is derived, if present, is selected from the group consisting of succinic acid, pentanedioic acid, adipic acid, heptanedioic acid, octanedioic acid, azelaic acid, sebacic acid, undecanedioic acid, dodecanedioic acid, brassylic acid, tetradecanedioic acid, hexanedecanedioic acid, octadecanedioic acid, eicosanedioic acid, docosanedioic acid, fatty acid dimers containing 36 carbons, or mixtures thereof; or the aromatic diacid monomer, from which the unit $Y_1$ is derived, is selected from the group consisting of terephtalic acid, isophtalic acid, naphthalenedicarboxylic acid, or mixtures thereof.

In some embodiments, the amorphous polyamide is a polyamide of formula $Z_1/X_1Y_1$.

In some embodiments, the amorphous polyamide is a polyamide of formula $Z_1/X_1Y_1$, wherein the unit $Z_1$ is derived from 11-aminoundecanoic acid, the unit $X_1$ is derived from bis(3-methyl-4-aminocyclohexyl)methane, and the unit $Y_1$ is derived from sebacic acid.

In some embodiments, the aliphatic semi-crystalline polyamide is a polyamide of formula $Z_2$, wherein the unit $Z_2$ is derived from an amino acid monomers being selected from the group consisting of 9-aminononanoic acid, 10-aminodecanoic acid, 10-aminoundecanoic acid, 11-aminoundecanoic acid, 12-aminododecanoic acid, derivatives thereof, especially N-heptyl-11-aminoundecanoic acid; preferably wherein the aliphatic semi-crystalline polyamide is a polyamide of formula $Z_2$ derived from 11-aminoundecanoic acid.

In some embodiments, the aliphatic semi-crystalline polyamide is a polyamide of formula $X_2Y_2$, or mixtures thereof;

wherein the aliphatic diamine monomer, from which the unit $X_2$ is derived, is selected from the group consisting of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, or mixtures thereof;

wherein the linear aliphatic diacid monomer, from which the unit $Y_2$ is derived, is selected from the group consisting of succinic acid, pentanedioic acid, adipic acid, heptanedioic acid, octanedioic acid, azelaic acid, sebacic acid, undecanedioic acid, dodecanedioic acid, brassylic acid, tetradecanedioic acid, hexanedecanedioic acid, octadecanedioic acid, eicosanedioic acid, docosanedioic acid, fatty acid dimers containing 36 carbons, or mixtures thereof.

In some embodiments, the aliphatic semi-crystalline polyamide is a polyamide of formula $X_2Y_2$, wherein the aliphatic diamine monomer, from which the unit $X_2$ is derived, is 1,10-decanediamine; and wherein the linear aliphatic diacid monomer, from which the unit $Y_2$ is derived, is sebacic acid.

In some embodiments, the glass fibers with a circular cross-section have a diameter from 4 to 25 μm, preferably from 4 to 15 μm, more preferably from 5 to 12 μm.

In some embodiments, the composition further comprises calcium stearate.

In some embodiments, the composition further comprises additive compounds; preferably additive compounds selected from the group consisting of antioxidants, pigments, dyes, optical brighteners, stabilizers, fluidifying agent, carbon black, or mixtures thereof.

The present invention makes it possible to overcome the drawbacks of the prior art. The invention provides a reinforced thermoplastic composition for obtaining molded articles, particularly injection-molded articles, having a reduced warpage i.e. a warpage of less than 2%, preferably of less than 1% of the longest dimension of the article. The invention also provides a reinforced thermoplastic composition for obtaining molded articles, particularly injection-molded articles, having a satisfactory mechanical resistance i.e. a tensile modulus of at least 10 GPa, an elongation at break of at least 2% and/or a stress at break of at least 140 MPa.

The inventors have shown that the warpage of the molded articles can be reduced by selecting the polyamide matrix including the polyamide weight ratio, the type of fiber glass and the melt viscosity of the fiber-reinforced thermoplastic composition. Without wishing of being bound by any theory, it is believed that the warpage could be reduced by obtaining a fiber-reinforced thermoplastic composition being fluid enough during injection. The drawbacks associated with the high rate of crystallization or the high degree of crystallinity are also avoided. In addition, the drawbacks associated with the fiber orientation and related local internal stress and shrinkage observed for high viscous materials are minimized.

DESCRIPTION OF EMBODIMENTS

The invention will now be described in more detail without limitation in the following description.

Throughout the description, all the percentages of the various constituents of the composition are given by weight, except if mentioned otherwise. The concentration ranges have to be considered as including the limits.

Molded Article

The molded article has a reduced warpage. By "reduced warpage" is meant a warpage of less than 2%, preferably less than 1%, of the longest dimension of the article. For example, the inventors have demonstrated that thin molded articles having a length of 100 mm according to the present invention (1 mm-thick plates with a square shape of 100 mm×100 mm) exhibit a reduced warpage of less than 2% (2 mm/100 mm×100=2%), preferably less than 1% (1 mm/100 mm×100=1%).

The molded article may be obtained with any suitable molding method, particularly with any suitable injection-molding method. Injection conditions may be adapted depending on the article produced, particularly for optimizing the production cycle. The article may be injected at a temperature ranging from 270 to 310° C., preferably about 300° C.; and using a mold temperature from 60 to 90° C., preferably from 70 to 80° C.

The molded article may have a satisfactory tensile modulus (GPa) i.e. of at least 10 GPa. The tensile modulus may be measured according to the ISO527-3:2018 standard, for example with the apparatus Instron 5966 commercialized by Instron, with a tensile speed of 1 mm/min.

The molded article may also have an elongation at break of at least about 2%. The elongation at break may be measured according to the ISO527-3:2018 standard, for example with the apparatus Instron 5966 commercialized by Instron, with a tensile speed of 5 mm/min.

The molded article may also have a satisfactory stress at break, for example of at least about 140 MPa. The stress at break may be measured according to the ISO527-3:2018 standard, for example with the apparatus Instron 5966 commercialized by Instron, with a tensile speed of 5 mm/min. Hence, the molded article may have a satisfactory mechanical resistance.

A suitable injection-molding method is for instance described in the textbook Injection Molding Technology and Fundamentals, Kamal and al., 2009, published by Carl Hanser Verlag GmbH & Co.

Reinforced Thermoplastic Composition

The fiber-reinforced thermoplastic composition comprises an amorphous polyamide matrix and glass fibers, notably short glass fibers, with a circular cross-section. The composition may also comprise calcium stearate. The composition may also comprise further additives, such as antioxidants, pigments, dyes, optical brighteners, stabilizers, fluidifying agents (for example polyamide prepolymers), carbon black, or mixtures thereof.

Amorphous Polyamide Matrix

By "matrix" is meant a polyamide blend comprising at least one amorphous polyamide and at least one aliphatic semi-crystalline polyamide.

The term "polyamide" is understood in the broad sense of the term i.e. a polymer containing amide functions resulting from a polycondensation reaction between carboxylic acid and amine functions. The term "polyamide", also denoted "PA", covers homopolymers or copolymers (copolyamides). Copolymers are based on various amide units, such as, for example, copolyamide 6/12 with amide units derived from lactam 6 and lactam 12. The symbol "/" serves to delimit the units of a copolyamide.

By "amorphous polyamide matrix" is meant a polyamide matrix having an enthalpy of melting of less than 30 J/g, preferably less than 20 J/g, more preferably less than 15 J/g, during heating at a speed of 20° C./min, measured by DSC (Differential Scanning calorimetry) according to the ISO11357-3: 2013 standard.

By "semi-crystalline polyamide matrix" is meant a polyamide matrix having an enthalpy of melting of more than 30 J/g, preferably more than 40 J/g, during heating at a speed of 20° C./min, measured by DSC (Differential Scanning calorimetry) according to the ISO11357-3: 2013 standard.

The nomenclature used to define polyamides is described in the ISO1874-1:2011 standard entitled *Plastics-Polyamide (PA) molding and extrusion materials—Part 1: Designation*, especially on page 3 (tables 1 and 2) and is well known to those skilled in the art.

The composition comprises an amorphous polyamide matrix comprising at least one specific amorphous polyamide and at least one specific aliphatic semi-crystalline polyamide. Both polyamides have been selected for obtaining an amorphous polyamide matrix, and not a semi-crystalline polyamide matrix. In one embodiment, an amorphous polyamide matrix consists essentially of, preferably consists of, at least one amorphous polyamide (including a mixture of at least two specific amorphous polyamides) and at least one aliphatic semi-crystalline polyamide (including a mixture of at least two aliphatic semi-crystalline polyamides). In one embodiment, the amorphous polyamide matrix is free from any polyamide, other than the amorphous polyamide(s) and the aliphatic semi-crystalline polyamide(s) as defined herewith.

The fiber-reinforced thermoplastic composition has a melt viscosity of at most 1,300 Pa·s, preferably of at most 1,250 Pa·s, more preferably of at most 1,200 Pa·s, still more preferably of at most 1,150 Pa·s, when measured at a shear rate of 110 s$^{-1}$ at 260° C. according to the ISO11443:2014 standard. The melt viscosity is measured with a Rheograph 25 capillary rheometer from Goettfer, having a barrel diameter of 12 mm, a D/L=1/30 (mm) at a temperature of 260° C. at a shear rate of 110 s$^{-1}$, according to the ISO11443:2014 standard.

The weight ratio between the amorphous polyamide and the aliphatic semi-crystalline polyamide in the amorphous polyamide matrix is from 60:40 to 90:10, preferably from 65:35 to 85:15, more preferably from 70:30 to 80:20. The weight ratio between the amorphous polyamide and the aliphatic semi-crystalline polyamide may in particular be of approximately 70:30 or approximately 80:20. The inventors have shown that there is the need for using a specific weight ratio between the amorphous polyamide and the aliphatic semi-crystalline, for obtaining an amorphous polyamide matrix, and not a semi-crystalline polyamide matrix.

The fiber-reinforced thermoplastic composition comprises from 30 to 70% by weight, preferably from 40 to 60% by weight, of the amorphous polyamide matrix, by total weight of the composition.

The amorphous polyamide matrix may comprise from 60 to 90% by weight, preferably from 65 to 85% by weight, of at least one amorphous polyamide, by total weight of the amorphous polyamide matrix.

The polyamide matrix may comprise from 10 to 40% by weight, preferably from 15 to 35% by weight, of at least one aliphatic semi-crystalline polyamide, by total weight of the amorphous polyamide matrix.

The Amorphous Polyamide

The amorphous polyamide is selected from the group consisting of homopolyamides of formula $X_1Y_1$ (also referred to as "$PAX_1Y_1$"), copolyamides of formula $Z_1/X_1Y_1$ (also referred to as "$PAZ_1/X_1Y_1$") and/or copolyamides of formula $X_0Y_0/X_1Y_1$ (also referred to as "$PAX_0Y_0/X_1Y_1$").

The unit $X_1$ is derived from a cycloaliphatic diamine monomer having from 8 to 18 carbons or a mixture of at least two of these monomers thereof.

In a preferred embodiment, the unit $X_1$ is not derived from an arylamine monomer, such as meta-xylylenediamine.

The unit $Y_1$ is derived from:
- a linear aliphatic diacid monomer having from 4 to 36 carbons, preferably from 6 to 18 carbons, more preferably from 6 to 15 carbons, still more preferably from 10 to 12 carbons, or a mixture of at least two of these monomers thereof; or
- an aromatic diacid monomer having from 6 to 18 carbons, preferably from 9 to 18 carbons, more preferably from 8 to 12 carbons, or a mixture of at least two of these monomers thereof.

The unit $Z_1$, if present, is derived from:
- an amino acid monomer (also referred to as "aminocarboxylic acid") having from 9 to 18 carbons, preferably from 9 to 12 carbons, more preferably from 10 to 12 carbons; or
- a lactam monomer having from 6 to 18 carbons, preferably from 9 to 18 carbons, more preferably from 9 to 12 carbons.

The unit $X_0$, if present, is derived from a linear aliphatic diamine monomer having from 4 to 18 carbons, preferably from 4 to 12 carbons, more preferably from 10 to 12 carbons, or a mixture of at least two of these monomers thereof.

The unit $Y_0$, if present, is derived from a linear aliphatic diacid monomer having from 4 to 36 carbons, preferably from 6 to 18 carbons, more preferably from 6 to 15 carbons, still more preferably from 10 to 12 carbons, or a mixture of at least two of these monomers thereof.

By "amorphous polyamide" is meant a polyamide having an enthalpy of melting during heating at a speed of 20° C./min measured by DSC (Differential Scanning calorimetry) according to the ISO11357-3:2013 standard of less than 30 J/g, preferably of less than 20 J/g, more preferably of less than 15 J/g.

The amino acid monomer, from which the unit $Z_1$ is derived, if present, may be selected from the group consisting of 9-aminononanoic acid, 10-aminodecanoic acid, 10-aminoundecanoic acid, 11-aminoundecanoic acid, 12-aminododecanoic acid, and derivatives thereof, especially N-heptyl-11-aminoundecanoic acid; preferably the amino acid is 11-aminoundecanoic acid. "Polyimide 11" or "PA11" is obtained from 11-aminoundecanoic acid.

The lactam monomer, from which the unit $Z_1$ is alternatively derived, if present, may be selected from the group consisting of caprolactam, pelargolactam, decanolactam, undecanolactam, lauryllactam, pyrrolidinone, 2-piperidinone, enantholactame, caprylolactam, and derivatives thereof.

The cycloaliphatic diamine monomer, from which the unit $X_1$ is derived, may be selected from the group consisting of bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (or 3,3'-dimethyl-4,4'-diamino-dicyclohexyl-methane—also referred to as "BMACM", "MACM" or "B."), p-bis(aminocyclohexyl)methane (also referred to as "PACM" or "P"), isopropylidenedi(cyclohexylamine) (also referred to as "PACP"), isophorone-diamine (also referred to as "IPD"), 2,6-bis(amino methyl)norbornane (also referred to as "BAMN"), bis(aminomethyl)cyclohexane (also referred to as "BAC", corresponding to 1,3-bis(aminomethyl)cyclohexane N° CAS: 2579-20-6) and/or 1,4-bis(aminomethyl)cyclohexane, N° CAS: 2549-07-9), or mixtures thereof; preferably selected from the group consisting of bis(3-methyl aminocyclohexyl)methane, p-bis(aminocyclohexyl) methane, bis(aminomethyl)cyclohexane, or mixtures thereof; more preferably the cycloaliphatic diamine monomer is bis(3-methyl-4-aminocyclohexyl)methane. A non-exhaustive list of cycloaliphatic diamine monomers is given in the publication Cycloaliphatic amines (Encyclopaedia of Chemical Technology, Kirk-Othmer, 4th Edition (1992), pp. 386-405).

The linear aliphatic diamine monomer, from which the unit $X_0$ is derived, may be selected from the group consisting of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, or mixtures thereof.

The linear aliphatic diacid monomer, from which the unit $Y_1$ and/or the unit $Y_0$ is derived, may be selected from the group consisting of succinic acid, pentanedioic acid, adipic acid, heptanedioic acid, octanedioic acid, azelaic acid, sebacic acid, undecanedioic acid, dodecanedioic acid, brassylic acid, tetradecanedioic acid, hexanedecanedioic acid, octadecanedioic acid, eicosanedioic acid, docosanedioic acid, fatty acid dimers containing 36 carbons, or mixtures thereof; preferably the linear aliphatic diacid monomer is sebacic acid.

The aromatic diacid monomer, from which the unit $Y_1$ is derived, may be selected from the group consisting of terephtalic acid ("T"), isophtalic acid ("I"), naphthalenedicarboxylic acid, or mixtures thereof. In case a mixture of terephtalic acid and isophtalic acid is used, this mixture may comprise from 50 mol %, preferably from 60 mol %, more preferably from 70 mol %, of terephthalic acid by the mixture of terephtalic acid and isophtalic acid.

In one embodiment, the amorphous polyamide is selected from the group consisting of polyamides of formula $Z_1/X_1Y_1$.

In one embodiment, the unit $Z_1$ is derived from amino acid monomers having from 9 to 18 carbons.

In one embodiment, the unit $X_1$ is derived from cycloaliphatic diamine monomers having from 8 to 18 carbons.

In one embodiment, the unit $Y_1$ is derived from linear aliphatic diacid monomers having from 4 to 36 carbons.

In one embodiment, the amorphous polyamide is a polyamide, wherein the unit $Z_1$ is derived from 11-aminoundecanoic acid, the unit $X_1$ is derived from bis(3-methyl-4-aminocyclohexyl)methane (also referred to as "BMACM", "MACM" or "B."), and the unit $Y_1$ is derived from sebacic acid.

In a preferred embodiment, the amorphous polyamide is the polyamide of formula $Z_1/X_1Y_1$ referred to as PA11/610 i.e. comprising a unit $Z_1$ derived from 11-aminoundecanoic acid, a unit $X_1$ derived from bis(3-methyl aminocyclohexyl) methane and a unit $Y_1$ derived from sebacic acid. In other embodiments, the amorphous polyamide may also be for example selected from the group consisting of PA11/B12, PA11/P10, PA11/P12, PA11/BI/BT, PA11/BACI, PA11/BACI/BACT, PA12/610, PA12/612, PA12/P12, PA12/BI/BT, PA1010/610, PA1010/P10, PA1012/P10, PA1012/612, PA1012/P12, PA1210/610, PA1210/612, PA1210/P10, PA1210/P12, PA1212/B12, PA1212/P12, PAB10, PAB12, PAB14, PAP10, PAP12, P14 or their mixtures.

The amorphous polyamides may have a glass transition temperature (Tg) of at least 100° C. The glass transition temperature is measured by DSC, at a heating speed of 20° C./min, according to the ISO11357-3: 2013 standard.

The Aliphatic Semi-Crystalline Polyamide

The aliphatic semi-crystalline polyamide is selected from the group consisting of a polyamide of formula $Z_2$ (also referred to as "PAZ$_2$"), a polyamide of formula $X_2Y_2$ (also referred to as "PAX$_2Y_2$"), or mixtures thereof;

wherein the unit $Z_2$, if present, is derived from an amino acid monomer having from 9 to 18 carbons (also referred to as "aminocarboxylic acid"), preferably from 8 to 12 carbons; or a lactam having from 6 to 18 carbons, preferably from 9 to 18 carbons, more preferably from 8 to 12 carbons;

wherein the unit $X_2$, if present, is an aliphatic diamine monomer from 4 to 18 carbons, preferably from 4 to 12 carbons, more preferably from 10 to 12 carbons, or mixtures thereof; and wherein the unit $Y_2$, if present, is a linear aliphatic diacid monomer having from 4 to 36 carbons, preferably from 6 to 18 carbons; more preferably from 6 to 15 carbons; still more preferably from 10 to 12 carbon atoms, or mixtures thereof.

By "semi-crystalline polyamide" is meant a polyamide having a melting point (measured by DSC according to the ISO11357-3:2013 standard) and having an enthalpy of melting (measured by DSC, at a heating speed of 20° C./min, according to the ISO11357-3:2013 standard) above 30 J/g, preferably above 40 J/g.

The amino acid monomer, from which the unit $Z_2$ is derived, may be selected from the group consisting of 9-aminononanoic acid, 10-aminodecanoic acid, 10-aminoundecanoic acid, 11-aminoundecanoic acid, 12-aminododecanoic acid, derivatives thereof, especially N-heptyl-11-aminoundecanoic acid; preferably from the group consisting of 11-aminoundecanoic acid or 12-aminododecanoic acid; more preferably the amino acid is 11-aminoundecanoic acid.

The lactam monomer, from which the unit $Z_2$ is alternatively derived, may be selected from the group consisting of pelargolactam, decanolactam, undecanolactam, lauryllactam, pyrrolidinone, 2-piperidinone, caprolactam, enantholactam, caprylolactam, and derivatives thereof; preferably the lactam monomer is lauryllactam.

The aliphatic diamine monomer, from which the unit $X_2$ is derived, may be selected from the group consisting of linear aliphatic diamine monomers, branched, aliphatic diamine monomers, or mixtures thereof; preferably linear aliphatic diamine monomers. The linear aliphatic diamine monomers may be selected from the group consisting of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, or mixtures thereof; preferably 1,10-decanediamine. The branched, aliphatic diamine monomers may be selected from the group consisting of 2,2,4-trimethyl-1,6-hexanediamine, 2,4,4-trimethyl-1,6-hexanediamine and 2-methyl-1,8-octanediamine.

The linear aliphatic diacid monomer having from 4 to 36 carbons, from which the unit $Y_2$ is derived, may be selected from the group consisting of succinic acid, pentanedioic acid, adipic acid, heptanedioic acid, octanedioic acid, azelaic acid, sebacic acid, undecanedioic acid, dodecanedioic acid, brassylic acid, tetradecanedioic acid, hexanedecanedioic acid, octadecanedioic acid, eicosanedioic acid, docosanedioic acid, fatty acid dimers containing 36 carbons, or mixtures thereof; preferably the linear aliphatic diacid monomer is sebacic acid.

With regards to the nomenclature, for example, the semi-crystalline polyamide PA1010 is a polyamide comprising $X_2$ units derived from 1,10-decanediamine, and $Y_2$ units derived from sebacic acid.

The aliphatic semi-crystalline polyamide may be for example selected from PA11, PA12, PA1010, PA1012, PA610, PA612, PA510, PA512, PA410, PA1210 or PA1212.

Glass Fibers with a Circular Cross-Section

The composition comprises glass fibers with a circular cross-section. By "glass fibers with a circular cross-section" or "circular glass fibers" or "round glass fibers" is meant glass fibers having a substantially circular cross-section, i.e. glass fibers having a L/D ratio of about 1, wherein "L" corresponds to the greatest dimension of the cross-section, and "D" corresponds to the smallest dimension of the cross-section. The glass fibers with a circular cross-section act as reinforcing agents, and therefore allow obtaining reinforced molded articles.

The glass fibers used in the composition have, before compounding, an average length of 0.1 to 100 mm, preferably of 0.5 to 10 mm and in particular of 1 to 5 mm. The glass fibers comprised in the composition may be shorter on average due to the effects of compounding.

The composition comprises from 30 to 70% by weight, preferably from 40 to 60% by weight, more preferably from 45 to 55% by weight, of glass fibers with a circular cross-section by total weight of the composition. The composition may comprise about 50% by weight of glass fibers with a circular cross-section by total weight of the composition.

The glass fibers with a circular cross-section have a diameter from 4 to 25 μm, preferably from 4 to 15 μm, more preferably from 5 to 12 μm. The diameter of the glass fibers with a circular cross-section may be measured using a scanning electron microscope.

The glass fibers with a circular cross-section have a length ranging from 2 to 13 mm, preferably from 3 to 8 mm, before compounding.

Suitable glass fibers with a circular cross-section are described in Frederick T. Wallenberger, James C. Watson and Hong Li, PPG industries Inc., ASM Handbook, Vol 21: composites (#06781G), 2001 ASM 25 International. Suitable glass fibers with a circular cross-section are for example the products marketed by Nittobo, such as the commercially available material CSX 3J-451.

Calcium Stearate (Additive)

The composition may comprise calcium stearate. Calcium stearate acts as a fluidifying agent.

The composition may comprise from 0.1 to 1% by weight, preferably from 0.1 to 0.7% by weight, more preferably from 0.2 to 0.4% by weight, of calcium stearate by total weight of the composition. The composition may comprise about 0.3% by weight of calcium stearate by total weight of the composition.

Further Additive Compounds

The composition may comprise additive compounds, other than calcium stearate. The additive compounds may be selected from the group consisting of antioxidants, pigments, dyes, optical brighteners, stabilizers, fluidifying agents, carbon black, or mixtures thereof.

The fluidifying agent may be a polyamide prepolymer. The polyamide prepolymer may be selected from the group consisting of linear or branched aliphatic polyamide oligomers, cycloaliphatic polyamide oligomers, semi-aromatic polyamide oligomers, aromatic polyamide oligomers, or mixtures thereof. In one embodiment, the prepolymer has an average molar mass from 1,000 to 10,000 g/mole, preferably from 1,000 to 5,000 g/mol. The polyamide prepolymer may be mono-functional —$NH_2$ (use of monoamine). The number average molar mass (Mn) or the amine index is calculated as follows: Mn=1,000/[$NH_2$], [$NH_2$] being the concentration in amine functions in the polyamide, as assessed for example by potentiometry. Particularly, a $NH_2$, mono-functional prepolymer may have a concentration in $NH_2$ (end groups) from 300 mmol/kg.

The composition may comprise from 0 to 10% by weight, preferably from 0.05 to 9% by weight, more preferably from 0.1 to 8% by weight, of further additive compounds by total weight of the composition.

The fiber-reinforced thermoplastic composition used according to the invention can be manufactured by any of the well-known methods for making polymer mixtures, in particular by mixing the resins in the melt along with the other components in a co-rotating twin-screw extruder.

The shear to which the fibers are exposed during mixing, notably in an extruder, may affect their average length. Thus, the pellets of fiber reinforced thermoplastic composition used according to the invention generally have an average fiber length of <1 mm, in particular of <700 μm, more particularly of <500 μm.

EXAMPLES

The reduction in warpage, when obtaining molded articles from fiber-reinforced thermoplastic composition according to the invention, has been assessed.

Materials

Polyamide PA11
Polyamide PA1010
Polyamide PA11/610
Polyamide PA12+polyamide B12+flat glass fibers (comparison): EMS-Grivory® TRVX-50X$_9$
Polyamide MXD10
Glass fiber with a circular cross-section and a length of 3 mm: CSX 3J-451 commercialized by Nittobo
Calcium stearate: Ligastab CAPSE commercialized by Greven
Antioxidants Compositions Tested Composition 1 (comparative): 49.40% of amorphous PA11/610, 50% glass fibers with a circular cross-section, 0.3% calcium stearate, 0.3% antioxidants; melt viscosity of 1,580 Pa·s.

Composition 2 (comparative): 49.40% of amorphous polyamide matrix (PA11/610 and PA1010 in a weight ratio 90/10), 50% glass fibers with a circular cross-section, 0.3% calcium stearate, 0.3% antioxidants; melt viscosity of 1,350 Pa·s.

Composition 3: 49.40% of amorphous polyamide matrix (PA11/1310 and PA1010 in a weight ratio 80/20), 50% glass fibers with a circular cross-section, 0.3% calcium stearate, 0.3% antioxidants; melt viscosity of 1,030 Pa·s.

Composition 4: 49.40% of amorphous polyamide matrix (PA11/1310 and PA1010 in a weight ratio 70/30), 50% glass fibers with a circular cross-section, 0.3% calcium stearate, 0.3% antioxidants; melt viscosity of 825 Pa·s.

Composition 5: 49.40% of amorphous polyamide matrix (PA11/1310 and PA1010 in a weight ratio 60/40), 50% glass fibers with a circular cross-section, 0.3% calcium stearate, 0.3% antioxidants; melt viscosity of 550 Pa·s.

Composition 6 (comparison—EMS-Grivory® TRVX-50X$_9$): amorphous polyamide matrix (PA12 and PAB12), 50% glass fibers with a non-circular cross-section (flat); melt viscosity of 700 Pa·s. Average fiber length in the pellet 380 μm.

Composition 7 (comparison—amorphous polyamide matrix): 49.40% of amorphous polyamide matrix (PA11/1310 and MXD10 in a weight ratio 80/20), 50% glass fibers with a circular cross-section, 0.3% calcium stearate, 0.3% antioxidants; melt viscosity of 980 Pa·s.

Composition 8: 49.40% of amorphous polyamide matrix (PA11/1310 and PA11 in a weight ratio 90/10), 50% glass fibers with a circular cross-section, 0.3% calcium stearate, 0.3% antioxidants; melt viscosity of 1,250 Pa·s.

Composition 9: 49.40% of amorphous polyamide matrix (PA11/1310 and PA11 in a weight ratio 80/20), 50% glass fibers with a circular cross-section, 0.3% calcium stearate, 0.3% antioxidants; melt viscosity of 1,000 Pa·s.

Composition 10: 49.40% of amorphous polyamide matrix (PA11/1310 and PA11 in a weight ratio 70/30), 50% glass fibers with a circular cross-section, 0.3% calcium stearate, 0.3% antioxidants; melt viscosity of 770 Pa·s.

Composition 11: 44.40% of amorphous polyamide matrix (PA11/1310 and PA1010 in a weight ratio 80/20), 50% glass fibers with a circular cross-section, 5% PA11 oligomer, 0.3% calcium stearate, 0.3% antioxidants; melt viscosity of 500 Pa·s.

Composition 12: 44.40% of amorphous polyamide matrix (PA11/1310 and PA1010 in a weight ratio 70/30), 50% glass fibers with a circular cross-section, 5% PA11 oligomer, 0.3% calcium stearate, 0.3% antioxidants; melt viscosity of 400 Pa·s.

The melt viscosity of compositions 1 to 12 is defined as follows: melt viscosity (Pa·s) measured at 260° C., under 110 s$^{-1}$ shear rate according to the ISO11443:2014 standard.

The compositions were prepared by blending and mixing polyamides, additives and fibers on a co-rotating twin-screw extruder. Barrels temperatures were set at 260° C. The glass fibers have been sidefed. The average fiber length in the pellet was less than 400 μm.

The injection-molded articles were prepared with an injection-molding machine.

Samples were injected at 300° C. using a mold temperature of 70° C.

Measurement Methods
  Tensile modulus (GPa): measured according to the ISO527-3:2018 standard at 23° C. (tensile speed=1 mm/min)
  Elongation at break (%): measured according to the ISO527-3:2018 standard at 23° C. (tensile speed=5 mm/min)
  Stress at break (MPa): measured according to the ISO527-3:2018 standard at 23° C. (tensile speed=5 mm/min)
  Puncture energies at 23° C. and −30° C.: measured according to the ISO179-1:2010 standard
  Enthalpy of melting: was measured by DSC at a heating speed of 20° C./min according to the ISO11357-3:2013 standard The warpage, which is measured 7-days post-injection, is determined as follows: the plates (1 mm-thick plates with a square shape of 100 mm×100 mm) obtained by injection are placed on a flat support; then we press three of the four corners of the plate, while the fourth corner is left un-pressed and therefore free to deform. The distance between the flat support and the sample is measured. The warpage is then calculated.

Assessment of the Warpage when Using a Polyamide Matrix Free of Aliphatic Semi-Crystalline Polyamide (Comparative Composition 1)

1 mm-thick injection-molded articles (plates) obtained from the comparative composition 1 (injection pressure of about 2,200 bars; melting temperature of about 300° C.; molding temperature of about 70° C.) have a warpage superior to 1% (1 mm/100 mm×100). The molded article obtained from a composition comprising a polyamide matrix free of an aliphatic semi-crystalline polyamide, and having a melt viscosity superior to 1300 Pa·s at 110 s$^{-1}$ and 260° C., does not have a reduced warpage.

Assessment of the Warpage of Comparative Composition 2

1 mm-thick injection-molded articles (plates) obtained from the comparative composition 2 (injection pressure of about 2,100 bars; melting temperature of about 300° C.; molding temperature of about 70° C.), having a melt viscosity superior to 1,300 Pa·s at 110 s$^{-1}$ and 260° C., have a warpage superior to 1% (1 mm/100 mm×100), for example between 3 and 4%.

Assessment of the Warpage when Using a Fiber-Reinforced Thermoplastic Composition (Compositions 3, 4, 5, 8, 9, 10, 11 and 12 Versus Comparative Compositions 6 and 7)

The molded articles obtained from compositions comprising an amorphous polyamide matrix and glass fibers with a circular cross-section (according to the invention) have a reduced warpage versus the molded articles obtained from the comparative composition 7. In addition, the molded articles obtained from compositions comprising an amorphous polyamide matrix and glass fibers with a circular cross-section (according to the invention) have a higher stress at break, versus the molded articles obtained from the comparative composition 6 and have therefore an increased mechanical resistance.

Experimental Results
  The data are shown in tables 1A and 1B below.

TABLE 1A

| Compositions | 1 comp | 2 comp | 3 | 4 | 5 | 6 comp | 7 comp |
|---|---|---|---|---|---|---|---|
| Injection pressure (bar) | 2,200 | 2,100 | 2,000 | 1,800 | 1,600 | 2,000 | 2,000 |
| Injection temperature (° C.) | 300 | 300 | 300 | 300 | 300 | 300 | 300 |
| Molding temperature (° C.) | 70 | 70 | 70 | 70 | 70 | 70 | 70 |
| Enthalpy of melting during heating at 20° C./min (measured by DSC) | <15 J/g | <15 J/g | <15 J/g | <15 J/g | <15 J/g | <15 J/g | <15 J/g |
| Tensile modulus (GPa) ISO527-1A | 13.2 | 13.8 | 13.9 | 14.2 | 14.3 | 13.2 | 14.5 |
| Elongation at break (%) ISO527-1A | 2.9 | 2.6 | 2.6 | 2.7 | 2.8 | 2.6 | 2.3 |
| Stress at break (MPa) ISO527-1A | 160 | 163 | 168 | 165 | 166 | 155 | 162 |
| Puncture energy at 23° C./−30° C. - ISO179, 1 eA (kJ/m$^2$) | 13/12 | 13/12 | 14/12 | 14/12 | 16/18 | 16/15 | 12/11 |
| Warpage on 1 mm × 100 mm × 100 mm -plate (%) | >2 | From <1 and >1 | <1 | <1 | <1 | <1 | >2 |

TABLE 1B

| Compositions | 8 | 9 | 10 | 11 | 12 |
|---|---|---|---|---|---|
| Injection pressure (bar) | 2030 | 1950 | 1750 | 1700 | 1650 |
| Injection temperature (° C.) | 300 | 300 | 300 | 300 | 300 |
| Molding temperature (° C.) | 70 | 70 | 70 | 70 | 70 |
| Enthalpy of melting during heating at 20° C./min (measured by DSC) | <15 J/g | <15 J/g | <15 J/g | <15 J/g | <15 J/g |
| Tensile modulus (GPa) ISO527-1A | 13.6 | 13.5 | 13.5 | 14.5 | 14.5 |
| Elongation at break (%) ISO527-1A | 2.7 | 2.8 | 3 | 2.6 | 2.7 |
| Stress at break (MPa) ISO527-1A | 164 | 165 | 168 | 173 | 171 |
| Puncture energy at 23° C./−30° C. - ISO179, 1eA (kJ/m$^2$) | 13/12 | 15/13 | 15/12 | 13/12 | 12/11 |
| Warpage on 1 mm × 100 mm × 100 mm plate (%) | <1 | <1 | <1 | <1 | <1 |

The invention claimed is:
1. A method comprising forming a molded article with reduced warpage from a fiber-reinforced thermoplastic composition,
  wherein the composition comprises:
    from 30 to 70% by weight of an amorphous polyamide matrix by total weight of the composition; and,
    from 30 to 70% by weight of glass fibers with a circular cross-section by total weight of the composition; and,
    optionally additives;
  wherein the amorphous polyamide matrix comprises at least one amorphous polyamide and at least one aliphatic semi-crystalline polyamide;

wherein the fiber-reinforced thermoplastic composition has a melt viscosity of at most 1,300 Pa·s, when measured at a shear rate of 110 s-1 at 260° C. according to the ISO11443:2014 standard;

wherein the weight ratio between the amorphous polyamide and the aliphatic semi-crystalline polyamide in the amorphous polyamide matrix is from 60:40 to 90:10;

wherein the amorphous polyamide is selected from the group consisting of homopolyamides of formula X1Y1, copolyamides of formula Z1/X1Y1 and/or copolyamides of formula X0Y0/X1Y1;

wherein the unit X1 is derived from a cycloaliphatic diamine monomer having from 8 to 18 carbons or a mixture of at least two of these monomers thereof;

wherein the unit Y1 is derived from a linear aliphatic diacid monomer having from 4 to 36 carbons or a mixture of at least two of these monomers thereof; or wherein the unit Y1 is derived from an aromatic diacid having from 6 to 18 carbons or a mixture of at least two of these monomers thereof;

wherein the unit Z1, if present, is derived from an amino acid monomer having from 9 to 18 carbons or a lactam monomer having from 6 to 18 carbons;

wherein the unit X0, if present, is derived from a linear aliphatic diamine monomer having from 4 to 18 carbons or a mixture of at least two of these monomers thereof;

wherein the unit Y0, if present, is derived from a linear aliphatic diacid monomer having from 4 to 36 carbons or a mixture of at least two of these monomers thereof;

wherein the aliphatic semi-crystalline polyamide is selected from the group consisting of polyamides of formula Z2 and/or polyamides of formula X2Y2;

wherein the unit Z2, if present, is derived from an amino acid having from 9 to 18 carbons; or a lactam having from 6 to 18 carbons;

wherein the unit X2, if present, is derived from an aliphatic diamine monomer from 4 to 18 carbons, or mixtures thereof; and wherein the unit Y2, if present, is derived from a linear aliphatic diacid monomer having from 4 to 36 carbons, or mixtures thereof.

2. The method according to claim 1, wherein the amino acid monomer, from which the unit Z1 is derived, if present, is selected from the group consisting of 9-aminononanoic acid, 10-aminodecanoic acid, 10-aminoundecanoic acid, 11-aminoundecanoic acid, 12-aminododecanoic acid, and derivatives thereof; or the lactam monomer, from which the unit Z1 is alternatively derived, if present, is selected from the group consisting of caprolactam, pelargolactam, decanolactam, undecanolactam, lauryllactam, pyrrolidinone, 2-piperidinone, enantholactame, caprylolactam, and derivatives thereof;

wherein the cycloaliphatic diamine monomer, from which the unit X1 is derived, is selected from the group consisting of bis(3,5-dialkyl-4-aminocyclohexyl) methane, bis(3,5-dialkyl-4-aminocyclohexyl) ethane, bis(3,5-dialkyl-4-aminocyclohexyl) propane, bis(3,5-dialkyl-4-aminocyclohexyl) butane, bis(3-methyl-4-aminocyclohexyl) methane, p-bis(aminocyclohexyl) methane, isopropylidenedi (cyclohexylamine), isophorone-diamine, 2,6-bis (amino methyl) norbornane, bis(aminomethyl) cyclohexane;

wherein the linear aliphatic diamine monomer, from which the unit X0 is derived, if present, is selected from the group consisting of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, or mixtures thereof;

wherein the linear aliphatic diacid monomer, from which the unit Y1 and/or the unit Y0 is derived, if present, is selected from the group consisting of succinic acid, pentanedioic acid, adipic acid, heptanedioic acid, octanedioic acid, azelaic acid, sebacic acid, undecanedioic acid, dodecanedioic acid, brassylic acid, tetradecanedioic acid, hexanedecanedioic acid, octadecanedioic acid, eicosanedioic acid, docosanedioic acid, fatty acid dimers containing 36 carbons, or mixtures thereof; or the aromatic diacid monomer, from which the unit Y1 is derived, is selected from the group consisting of terephtalic acid, isophthalic acid, naphthalenedicarboxylic acid, and mixtures thereof.

3. The method according to claim 1, wherein the amorphous polyamide is a polyamide of formula Z1/X1Y1.

4. The method according to claim 1, wherein the amorphous polyamide is a polyamide of formula Z1/X1Y1, wherein the unit Z1 is derived from 11-aminoundecanoic acid, the unit X1 is derived from bis(3-methyl-4-aminocyclohexyl) methane, and the unit Y1 is derived from sebacic acid.

5. The method according to claim 1, wherein the aliphatic semi-crystalline polyamide is a polyamide of formula Z2, wherein the unit Z2 is derived from an amino acid monomers being selected from selected from the group consisting of 9-aminononanoic acid, 10-aminodecanoic acid, 10-aminoundecanoic acid, 11-aminoundecanoic acid, 12-aminododecanoic acid, derivatives thereof.

6. The method according to claim 1, wherein the aliphatic semi-crystalline polyamide is a polyamide of formula X2Y2;

wherein the aliphatic diamine monomer, from which the unit X2 is derived, is selected from the group consisting of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, or mixtures thereof;

wherein the linear aliphatic diacid monomer, from which the unit Y2 is derived, is selected from the group consisting of succinic acid, pentanedioic acid, adipic acid, heptanedioic acid, octanedioic acid, azelaic acid, sebacic acid, undecanedioic acid, dodecanedioic acid, brassylic acid, tetradecanedioic acid, hexanedecanedioic acid, octadecanedioic acid, eicosanedioic acid, docosanedioic acid, fatty acid dimers containing 36 carbons, or mixtures thereof.

7. The method according to claim 1, wherein the aliphatic semi-crystalline polyamide is a polyamide of formula X2Y2, wherein the aliphatic diamine monomer, from which the unit X2 is derived, is 1-10-decanediamine; and wherein the linear aliphatic diacid monomer, from which the unit Y2 is derived, is sebacic acid.

8. The method according to claim 1, wherein the glass fibers with a circular cross-section have a diameter from 4 to 25 μm.

9. The method according to claim 1, wherein the composition further comprises calcium stearate.

10. The method according to claim 1, wherein the composition further comprises additive compounds.

\* \* \* \* \*